US006941053B2

(12) United States Patent
Lauzon et al.

(10) Patent No.: US 6,941,053 B2
(45) Date of Patent: Sep. 6, 2005

(54) TRIPLE-CLAD RARE-EARTH DOPED OPTICAL FIBER AND APPLICATIONS

(75) Inventors: Jocelyn Lauzon, Beaconsfield (CA); AndréCroteau, Saint-Agapit (CA)

(73) Assignee: Institut National d'Optique (CA)

( * ) Notice: Subject to any disclaimer, the term of this patent is extended or adjusted under 35 U.S.C. 154(b) by 132 days.

(21) Appl. No.: 10/241,239

(22) Filed: Sep. 11, 2002

(65) Prior Publication Data
US 2003/0152349 A1 Aug. 14, 2003

Related U.S. Application Data

(63) Continuation of application No. 09/593,272, filed on Jun. 13, 2000, now abandoned.

(30) Foreign Application Priority Data

Dec. 24, 1999 (CA) ............................................. 2293132

(51) Int. Cl.[7] ............................. G02B 6/02; G02B 6/22
(52) U.S. Cl. ........................ 385/126; 385/127; 385/128
(58) Field of Search ................................. 385/123–128

(56) References Cited

U.S. PATENT DOCUMENTS

| | | | |
|---|---|---|---|
| 4,815,079 A | 3/1989 | Snitzer et al. ................. | 372/6 |
| 5,533,516 A | 7/1996 | Muendel ..................... | 385/126 |
| 5,659,644 A | 8/1997 | DiGiovanni et al. .......... | 385/31 |
| 5,949,941 A | 9/1999 | DiGiovanni ................ | 385/127 |
| 5,966,491 A | 10/1999 | DiGiovanni ................ | 385/127 |
| 6,192,713 B1 | 2/2001 | Zhang ......................... | 65/390 |
| 6,275,632 B1 * | 8/2001 | Waarts et al. ................. | 385/37 |

FOREIGN PATENT DOCUMENTS

| | | | |
|---|---|---|---|
| EP | 0 802 592 A2 | 10/1997 | ............. H01S/3/06 |
| WO | WO 95/10868 | 4/1995 | ............. H01S/3/06 |

OTHER PUBLICATIONS

G.G. Vienne et al., "Fabrication and charachterization of YB[3+]:Er[3+]phosphosilicate fiber for lasers," J. of Lightwave Technol., vol. 16, No. 11, pp. 1990–2001, Nov. 1998.

H. Zellmer et al., "Fiber lasers—compact laser light sources for the near infrared spectral range," Laser und Optoelektronik, vol. 29, No. 4, pp. 53–59, Aug. 1997.

L. Goldberg et al., "High–efficiency side–coupling of light into double–cladding fibers using imbedded V–grooves," OFC'96 Technical Digest, pp. 91–92, 1996.

R. Paschotta et al., "Ytterbium–doped fiber amplifiers, " IEEE J. of Quantum Electron., vol. 33, No. 7, pp. 1049–1056, Jul. 1997.

* cited by examiner

Primary Examiner—Brian Healy
Assistant Examiner—Kevin S. Wood
(74) Attorney, Agent, or Firm—Akerman Senterfitt

(57) ABSTRACT

An optical fiber comprises a singlemode core, and an inner cladding disposed around said core, an intermediate cladding disposed around said inner cladding and an outer cladding disposed around said intermediate cladding thereby forming a triple-clad geometry. The core is doped with rare-earth elements and represents the waveguide section of higher refractive index through which the signal is transmitted and amplified. A fiber coating is provided around said outer cladding. The core has a higher refractive index than said inner cladding, said inner cladding having a higher refractive index than said intermediate cladding, and said intermediate cladding having a higher refractive index than said outer cladding. The inner cladding has a fairly high refractive index to limit the numerical aperture (NA) of said core. The inner cladding is within said intermediate, larger, cladding which is made of glass, that is used to guide multimode, high-power pump, said inner cladding acting as an intermediate level between said core and said multi-mode pump guiding intermediate cladding, with said outer cladding being present in said optical fiber for allowing said intermediate cladding to guide the pump power properly. The outer cladding is made of glass or of a low-index polymer material. The inner cladding is adapted to trap some of the pump signal into a smaller section in order to accelerate the absorption of the pump power.

11 Claims, 1 Drawing Sheet

TRIPLE-CLAD RARE-EARTH DOPED OPTICAL FIBER AND APPLICATIONS

CROSS REFERENCE TO RELATED APPLICATIONS

This application is a continuation of U.S. patent application Ser. No. 09/593,272 filed Jun. 13, 2000 and titled Triple-Clad Rare-Earth Doped Optical Fiber and Applications.

BACKGROUND OF THE INVENTION

1. Field of the Invention

The present invention relates to the field of optical fibers and, more particularly, to high output power fiber amplifiers or lasers.

2. Description of the Prior Art

There is a demand to increase the output power of fiber amplifiers/lasers. This demand is motivated by DWDM (Dense Wavelength Division Multiplexing) optical communication where multiple data channels have to be amplified simultaneously sharing the available amplifier output power with one another. Another growing application is OISL (Optical Inter-Satellite Links), where a diffraction-limited beam has to be emitted in free-space and received thousands of kilometers away. In this last case, the propagation distances prescribe high-power lasers, and the diffraction-limited quality of the optical beam prescribes using singlemode, low numerical aperture (NA), optical fiber amplifiers. The NA is calculated as follows:

$$NA = [n_{core}^2 - n_{cladding}^2]^{1/2}$$

where n represents the respective refractive indexes of the materials.

For similar reasons, LIDAR (Light Detection and Ranging) applications also demand high-power lasers, and for some particular applications, high-power fiber lasers.

The power output of fiber lasers/amplifiers is directly related to the absorbed pump power in the amplifier fiber (rare-earth doped) section, and thus it is related to the amount of pump-power that can be coupled into the same fiber. The amplified signal has to be laterally singlemode in order to have stable amplification and diffraction-limited output with high output power. Thus, the amplification (doped) region must be confined to a singlemode core. For optical amplification to occur, the pump must overlap with the signal in this singlemode doped core. Coupling a pump signal into a singlemode core means using a small area laser diode. In fact, the diode active area must be smaller than the diameter of the singlemode core to allow efficient coupling. Limiting the pump diode active area limits its output power proportionally, which in turn limits the output power of the fiber laser/amplifier. The obvious way to get around this limitation is to use a multiple-clad rare-earth doped fiber. The high-power, broad area (or even diode arrays or matrix) pump diode signal would be coupled to a larger multimode region inside which the rare-earth doped singlemode core would be present (see U.S. Pat. No. 4,815,079 issued on Mar. 21, 1989 to Snitzer et al., and U.S. Pat. No. 5,533,163 issued on Jul. 2, 1996 to Muendel).

The challenge remains to optimize the efficiency of the amplifier fiber. To do so, the overlap of the singlemode core and the multimode pump power must be as high as possible. This allows to have a lower bleaching power threshold (less pump power wasted) and to be able to use a shorter length of rare-earth doped fiber: lower cost, lower volume, lower background loss, higher nonlinear effect threshold. The core must also have very high pump absorption per length unit in order to obtain the same benefits. To do so, the rare-earth doped singlemode core must be highly doped and have as large a diameter as possible (R. Paschotta et al., "Ytterbium-doped fiber amplifiers", IEEE J. of Quantum Electron., vol. 33, no. 7, pp. 1049–1056, Jul. 1997).

The geometry of the fiber must also be chosen so that the different pump power modes are mixed to eventually overlap with the rare-earth doped inner core. That can be done by having a polygon-shaped pump guiding region (see H. Zellmer et al., "Fiber lasers—compact laser light sources for the near infrared spectral range", Laser und Optoelektronik, vol. 29, no. 4, pp. 53–59, Aug. 1997, and aforementioned U.S. Pat. Nos. 4,815,079 and 5,533,163). The overlap between the rare-earth doped core and the different pump power modes can also be helped by using an off-center core (see aforementioned H. Zellmer et al., "Fiber lasers—compact laser light sources for the near infrared spectral range" and U.S. Pat. No. 4,815,079).

Also known in the art are: (1) G. G. Vienne et al., "Fabrication and characterization of $Yb^{3+}$: $Er^{3+}$ phosphosilicate fiber for lasers", J. of Lightwave Technol., vol. 16, no 11, pp. 1990–2001, November 1998; (2) L. Goldberg et al., "High-efficiency side-coupling of light into double-cladding fibers using imbedded V-grooves", OFC'96 technical Digest, p. 91, 1996; (3) V. P. Gapontsev et al.'s PCT Publication No. WO95/10868 published on Apr. 20, 1995 in the name of Italtel Societa Italiana Telecomunicazioni S.P.A.; (4) H. Bruesselbagh et al., European Patent Publication No. EP-0 802 592-A2 published on Oct. 22, 1997 in the name of He Holdings, Inc. dba Hughes Electronics; and (5) U.S. Pat. No. 5,659,644 issued on Aug. 19, 1997 to DiGiovanni et al.

SUMMARY OF THE INVENTION

It is therefore an aim of the present invention to provide an improved rare-earth doped optical fiber for high power amplifiers/lasers.

It is also an aim of the present invention to provide such a rare-earth doped optical fiber which has a triple-clad configuration.

Therefore, in accordance with the present invention, there is provided an optical fiber, comprising a singlemode core, and an inner cladding disposed around said core, an intermediate cladding disposed around said inner cladding and an outer cladding disposed around said intermediate cladding thereby forming a triple-clad geometry.

More particularly, the core is doped with rare-earth elements and represents the waveguide section of higher refractive index through which the signal is transmitted and amplified. A fiber coating is provided around said outer cladding.

The core has a higher refractive index than said inner cladding, said inner cladding having a higher refractive index than said intermediate cladding, and said intermediate cladding having a higher refractive index than said outer cladding.

The inner cladding has a fairly high refractive index to limit the numerical aperture (NA) of said core, said numerical aperture being evaluated as follows:

$$NA = [n_{core}^2 - n_{cladding}^2]^{1/2}$$

where n represents the refractive indexes of the materials.

The inner cladding is within said intermediate, larger, cladding which is made of glass, that is used to guide multimode, high-power pump, said inner cladding acting as an intermediate level between said core and said multi-mode pump guiding intermediate cladding, with said outer cladding being present in said optical fiber for allowing said intermediate cladding to guide the pump power properly.

The outer cladding is made of glass or of a low-index polymer material.

The inner cladding is adapted to trap some of the pump signal into a smaller section in order to accelerate the absorption of the pump power.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
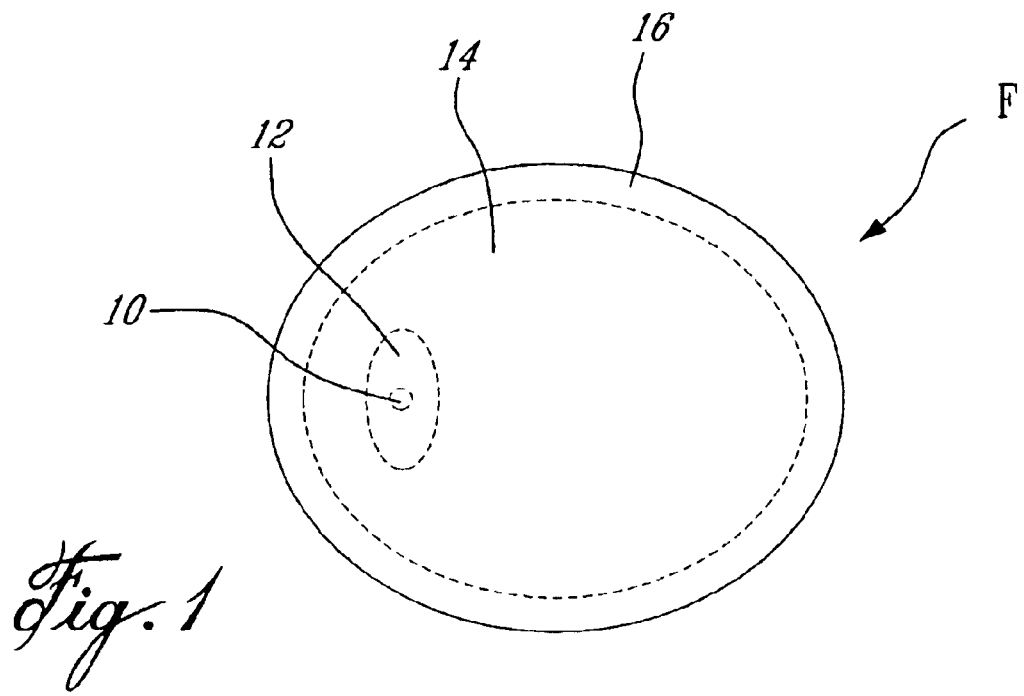
FIG. 1 is a schematic cross-sectional representation of a triple-clad rare-earth doped fiber in accordance with the present invention.

The present invention consists in a rare-earth doped optical fiber F which has a triple-clad geometry. More particularly, the optical fiber F comprises an inner core 10 and, inward out, a first inner cladding 12, a second intermediate cladding 14 and a third outer cladding 16. The core 10 represents the waveguide section of higher refractive index through which the signal is transmitted and amplified. The core 10 is singlemode core and is doped with rare-earth elements useful for the transfer of energy between the pump and signal. The first cladding 12 of the core 10 has a fairly high refractive index level in order to limit the rare-earth doped core numerical aperture (NA) which is evaluated as follows:

$$NA=[n_{core}^2-n_{cladding}^2]^{1/2}$$

where n represents the refractive indexes of the materials. A low NA allows the use of a larger core while keeping the singlemode property. This also allows to control the divergence of the amplified signal at the output of the fiber F. This first cladding 12 is within the second, larger cladding 14, made of glass, that is used to guide multimode, high-power pump. In order for the second cladding 14 to guide the pump power properly, the third cladding 16 had to be added to the geometry of the present fiber F. This third cladding 16 can be made of glass or of a low-index polymer material. The pump power is then absorbed in the inner rare-earth doped core 10 and converted into a useful singlemode signal.

The first cladding 12 helps the amplifier fiber efficiency since it allows a large rare-earth doped inner core 10 to be made. Indeed, in order to favor the pump absorption in a multiple cladding fiber, the inner core must be as large as possible to maximize the overlap with the multimode pump section, and it should also have very high absorption. To increase useful power conversion absorption of the pump, the concentration of rare-earth dopants must be increased. However, by increasing the concentration of rare earth dopants, the refractive index of the core increases proportionally. This means that the NA of the inner core increases and thus a smaller inner core must be used in order to maintain the necessary singlemode property of the inner core.

The only way around this is to increase the first cladding refractive index in order to maintain a lower NA while having a high rare-earth doped concentration n the inner core. With the current fiber fabrication techniques, it is not possible to maintain a large cladding refractive index through all the optical fiber cross-section. Thus the first cladding 12 of the present optical fiber F acts as an intermediate level between the inner core 10 and the multimode pump guiding section 14. This intermediate level also has the advantage of providing more possibilities in designing the multiple cladding optical fiber geometry. It can also be useful in order to trap some of the pump signal into a smaller section in order to accelerate the absorption of the pump power.

It is noted that FIG. 1 does not show the fiber coating which is added outside the useful fiber cross-section of the triple-clad rare-earth doped optical fiber F, i.e. around the third cladding 16.

Figure 2:
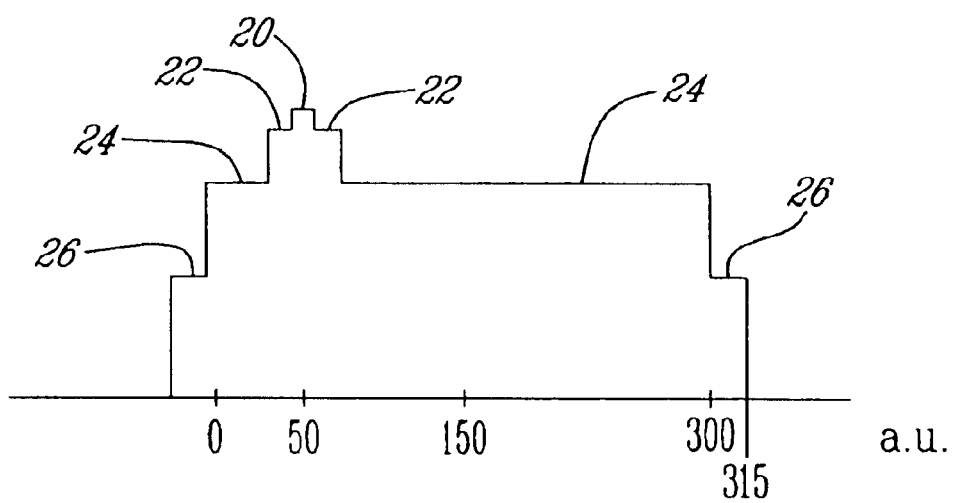
FIG. 2 is a schematic graphic representation of the refractive index profile of the various sections of the fiber of FIG. 1.

In FIG. 2, a graphic is presented to show the relative refractive indexes of the various sections of the fiber F of FIG. 1. More particularly, the refractive indexes of the core 10 and the first, second and third claddings 12, 14 and 16, respectively, are respectively indicated at 20, 22, 24 and 26. On the graphic representation of FIG. 2, the ordinate (i.e. the y-axis) corresponds to relative refractive indexes of the different sections of the optical fiber F, whereas the abscissa (i.e. the x-axis) corresponds to an arbitrary value relating to the diameter of the optical fiber F, that is the fiber cross-section or diameter, which is measured in a unit of length, generally in micrometers.

The optical fiber F of FIG. 1 represents just one example of the possible different fiber geometries that the present invention allows. For another possible geometry, the rare-earth doped core 10 can be centered in order to simplify fusion splicing to another fiber and the first cladding 12 can be asymmetrically positioned in relation to the fiber center in order to provide pump power mode mixing. For a yet another possible geometry, the second cladding 14 may have a convex polygon cross-section. Any of the triple-clad rare-earth doped fiber sections, i.e. the core 10 or the three different claddings 12, 14 and 16, can be made to be polarization-maintaining using any of the known techniques to do so: elliptical core, elliptical clad, panda or bow-tie configurations, D-shaped sections, etc. These few geometry examples do not limit the scope of the invention which covers any triple-clad rare-earth doped optical fiber geometry.

Thus, the present optical fiber f has a triple-clad fiber configuration that allows multimode high-power pumping of a singlemode signal to be amplified while optimizing the overlap between the pump and signal, thus optimizing the power conversion efficiency between the pump and signal, in order to make efficient optical amplifiers or lasers.

What is claimed is:

1. A triple-clad optical fiber for high power cladding-pumped fiber amplifiers and lasers, the triple-clad fiber comprising the following elements:

a singlemode core doped to provide an amplification region, and an inner cladding disposed around said core, and an intermediate cladding disposed around said inner cladding and larger than said inner cladding for guiding pump power, and an outer cladding disposed around said intermediate cladding, and wherein:

said inner cladding has a refractive index lower than a refractive index of said core and higher than a refractive index of said intermediate cladding allowing for a low numerical aperture of said core, and said outer cladding has a refractive index lower than the refractive index of said intermediate cladding allowing said pump power to be convinced inside a volume limited by said outer cladding.

2. An optical fiber as defined in claim 1, wherein said core is doped with rare-earth elements and represents the waveguide section of higher refractive index through which a signal is transmitted and amplified.

3. An optical fiber as defined in claim 1, wherein a fiber coating is provided around said outer cladding.

4. An optical fiber as defined in claim 1, wherein said inner cladding is within said intermediate, larger, cladding which is made of glass, that is used to guide multimode, high-power pump, said inner cladding acting as an intermediate level between said core and said multi-mode pump guiding intermediate cladding, with said outer cladding being present in said optical fiber for allowing said intermediate cladding to guide the pump power property.

5. An optical fiber as defined in claim 1, wherein said outer cladding is made of glass or of a low-index polymer material.

6. An optical fiber as defined in claim 1, wherein said inner cladding is adapted to trap some of a pump signal into a smaller section in order to accelerate an absorption of a pump power.

7. An optical fiber as defined in claim 1, wherein said core is centered in said optical fiber.

8. An optical fiber as defined in claim 1, wherein said inner cladding is asymmidtrically positioned in relation to the fiber center in order to provide pump power mode mixing.

9. An optical fiber as defined in claim 1, wherein said intermediate cladding has a convex polygonal cross-section.

10. An optical fiber as defined in claim 1, wherein any of said core or said inner, intermediate and outer claddings is made to be polarization-maintaining using any of one an elliptical core, an elilptical clad, a panda or bow-tie configuration, and a D-shaped section.

11. An optical fiber as defined in claim 1, wherein the triple-lad configuration of said optical fiber is adapted to allow multimode high-power pumping of a singlemode signal to be amplified while optimizing the overlap between the pump and signal, thus optimizing the power conversion efficiency between the pump and signal, in order to make efficient optical amplifiers or lasers.

* * * * *

UNITED STATES PATENT AND TRADEMARK OFFICE
CERTIFICATE OF CORRECTION

PATENT NO.         : 6,941,053 B2                                   Page 1 of 1
APPLICATION NO. : 10/241239
DATED              : Septemeber 6, 2005
INVENTOR(S)        : Lauzon et al.

It is certified that error appears in the above-identified patent and that said Letters Patent is hereby corrected as shown below:

Title Page, Item (75) replace "AndréCroteau" with --André Croteau--.

Column 4, line 3, replace "n" with --in--.

Column 4, line 49, replace "f" with --F--.

Claim 1, Column 5, line 7, replace "convinced" with --confined--.

Claim 8, Column 6, line 8, replace "asymmidtrically" with --asymmetrically--.

Claim 10, Column 6, line 16, replace "elilptical" with --elliptical--.

Claim 11, Column 6, Line 19, replace "lad" with --clad--.

Signed and Sealed this

Twelfth Day of September, 2006

JON W. DUDAS
*Director of the United States Patent and Trademark Office*